(12) United States Patent
Su et al.

(10) Patent No.: US 11,989,545 B2
(45) Date of Patent: May 21, 2024

(54) FLEXIBLE UPGRADE OF MULTI-SUBSYSTEM PRODUCTS

(71) Applicant: EMC IP Holding Company LLC, Hopkinton, MA (US)

(72) Inventors: Lihui Su, Shanghai (CN); James Morton, Adamstown, MD (US); Arun Murti, Mission Viejo, CA (US); Chegu Vinod, San Jose, CA (US); Ming Zang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 195 days.

(21) Appl. No.: 16/831,178

(22) Filed: Mar. 26, 2020

(65) Prior Publication Data

US 2021/0334082 A1    Oct. 28, 2021

(51) Int. Cl.
*G06F 8/65* (2018.01)

(52) U.S. Cl.
CPC ..................................... *G06F 8/65* (2013.01)

(58) Field of Classification Search
CPC .......... G06F 8/65; G06F 8/71; G06F 11/3006; G06F 8/60
See application file for complete search history.

(56) References Cited

U.S. PATENT DOCUMENTS

| | | | |
|---|---|---|---|
| 9,626,176 B2 * | 4/2017 | Thomas | G06F 8/658 |
| 2016/0026547 A1 * | 1/2016 | Vidal | G06F 11/1479 714/15 |
| 2019/0028331 A1 * | 1/2019 | Kovacheva | H04L 41/0895 |
| 2019/0031203 A1 * | 1/2019 | Fox | G06F 8/654 |
| 2019/0146773 A1 * | 5/2019 | Attard | G06F 8/61 717/169 |
| 2019/0317750 A1 * | 10/2019 | Ramsay | G06F 9/45558 |
| 2020/0042303 A1 * | 2/2020 | Samuel | G06F 9/4411 |
| 2021/0200881 A1 * | 7/2021 | Joshi | H04L 63/0428 |

* cited by examiner

*Primary Examiner* — S. Sough
*Assistant Examiner* — Cheneca Smith
(74) *Attorney, Agent, or Firm* — Dergosits & Noah LLP; Todd A. Noah (57) ABSTRACT

Described is a system that provides for granular and customized upgrades of sub-systems deployed within a third-part system. The system generates an upgrade manager service for implementation of a first sub-system upgrade package from within a third-party system that hosts the first sub-system. The system generates the first sub-system upgrade package according to a compatibility with a first sub-system version currently deployed in the third-party system to update the first sub-system with a feature(s) available in an upgraded version of the first sub-system. The system sends the upgrade manager service to the third-party system. The system receives a first request for the first sub-system upgrade package from the upgrade manager service running in the third-party system. The system sends the first sub-system upgrade package for implementation at the first sub-system by the upgrade manager service running in the third-party system.

20 Claims, 7 Drawing Sheets

```
{
    "name": "Dell EMC PowerProtect Data Manager - Major
Release",                            /⎯314
    "packageVersion": "19.1.0-24",
    "type": "RELEASE",
    "madeAvailable": "2019-06-01T00:56:08Z",
    "description": "This package upgrades all the
components",
    "rebootRequired": "true",
    "subComponentDetails": [        /⎯316
        {"componentName":"PPDM",
"upgradeVersion":"19.1.0-24"},   /⎯318
        {"componentName":"VSO",
"upgradeVersion":"6.3.0.4-628708"}, /⎯320
        {"componentName":"vProxy",
"upgradeVersion":"19.1.0-3","minimumVersion":"19.1.0-
1", "dependency": "PPDM"},
    ]
}
```

FLEXIBLE UPGRADE OF MULTI-SUBSYSTEM PRODUCTS

TECHNICAL FIELD

This disclosure relates to system upgrades, and more particularly, sub-system upgrades.

BACKGROUND

Conventional systems require installation of an entire and a separate upgrade application. Conventional upgrade techniques are directed to a whole system in its entirety which first requires upgrading the separate upgrade application itself and then applying all upgrades to the whole system. Such conventional upgrade techniques incur extra costs and management overheads from having to manage different upgrading phases from the separate upgrade application and then to the whole underlying system. In addition, conventional upgrade techniques provide generalized upgrade software and logic for the whole underlying system. A conventional system may run pre-checks, however, such conventional pre-checks are executed according to logic and versions of the currently deployed whole underlying system and fail to account for any possible consequences that will be experienced by the whole underlying system as a result of executing the generalized upgrade software and logic generalized upgrade software and logic.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

Described is a system (and method and computer program product) for an Upgrade Engine that provides for granular and customized upgrades of sub-systems deployed within a third-party system. The Upgrade Engine generates an upgrade manager service for implementation of a first sub-system upgrade package from within a third-party system that hosts the first sub-system. The Upgrade Engine generates the first sub-system upgrade package according to a compatibility with a first sub-system version currently deployed in the third-party system to update the first sub-system with a feature(s) available in an upgraded version of the first sub-system. The Upgrade Engine sends the upgrade manager service to the third-party system. The Upgrade Engine receives a first request for the first sub-system upgrade package from the upgrade manager service running in the third-party system. The Upgrade Engine sends the first sub-system upgrade package for implementation at the first sub-system by the upgrade manager service running in the third-party system.

According to various embodiments, a first upgrade manager service may be a most-recent upgrade manager service generated by the Upgrade Engine. The first upgrade manager service begins execution at a third-party system (or a master sub-system). The first upgrade manager service may initially check a central repository associated with the Upgrade Engine for available sub-system upgrade packages that correspond with active sub-systems hosted by the third-party system. The first upgrade manager service may download and implement the available sub-system upgrade packages from within the third-party system. Upon completion of implementing the sub-system upgrade packages, the first upgrade manager service stops executing within the third-party system.

The Upgrade Engine may subsequently generate a second upgrade manager service, which may be sent to the third-party system to be executed in place of the first upgrade manager service. When the second upgrade manager service begins execution at the third-party system, the second upgrade manager service may then also initially check the central repository for available sub-system upgrade packages generated by the Upgrade Engine after the first upgrade manager service implemented any of the previously downloaded sub-system upgrade packages. Since the Upgrade Engine continually generates new versions of the upgrade manager service and the sub-system upgrade packages, the Upgrade Engine avoids the disadvantages of conventional techniques that require having to install, upgrade and maintain an independent upgrade application at the third-party system. In some embodiments, the third-party system (or master sub-system). may be a data protection system, for example.

It is understood that the Upgrade Engine includes source code, software modules and/or software instructions to perform and/or execute the steps, methods and operations described herein. It is further understood that by generating the upgrade manager, the Upgrade Engine generates, builds, gathers, and/or packages source code, software modules and/or software instructions to perform and/or execute the steps, methods and operations at a third-party system located remotely from the Upgrade Engine. According to some embodiments, it is understood that that a software developer(s) may operate the Upgrade Engine to create source code, software modules and/or software instructions to perform and/or execute the steps, methods and operations described herein. It is further understood that by generating the upgrade manager, software developer(s) may operate the Upgrade Engine to generate, build, gather, and/or package source code, software modules and/or software instructions to perform and/or execute the steps, methods and operations at a third-party system located remotely from the Upgrade Engine.

In some embodiments, such a system may be provided within an operating environment. An example of such an operating environment is further described herein with reference to FIG. 1. However, in general, embodiments of the disclosure may include and/or be implemented in an operating environment including a cloud services environment that may be, or include, a data protection operating environment that includes a backup and clustered storage environment. For example, at least some functionality may be provided by, or implemented in connection with, various platforms for data protection platform provided by Dell EMC™ Corporation, and associated systems, methods, and components, although use of this particular platform is provided only by way of illustration and is not required.

In some embodiments, the storage environment may take the form of a cloud storage environment. However, embodiments of the disclosure may also be implemented for an on-premises storage environment, and hybrid storage environments that include public and private elements, as well as any other type of storage environment. In addition, any of these cloud environments, or other operating environments, may take the form of an operating environment that is partly, or completely, virtualized. The storage environment may include one or more host devices that each host one or more applications used by a client of the storage environment. As such, a particular client may employ, or otherwise be associated with, one or more instances of each of one or more applications. In general, the applications employed by the clients are not limited to any particular functionality or type of functionality. Some example applications may include database applications (e.g. a SQL Server), filesystems, as well as other types of data stores. The applications on the clients may generate new and/or modified data that is desired to be protected.

Any of the devices, including the clients, servers and hosts, in the operating environment can take the form of software, physical machines, or virtual machines (VM), or any combination thereof, though no particular device implementation or configuration is required for any embodiment. Similarly, data protection system components such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the term "backup" (or "data backups," "backed-up data," etc.) is intended to be construed broadly and includes, but is not limited to, partial backups, incremental backups, full backups, clones, snapshots, any other type of copies of data, and any combination of the foregoing. Any of the foregoing may, or may not, be deduplicated. In addition, the storage of data can employ any suitable storage technique, infrastructure, hardware (e.g. Solid State Drive (SSD), Hard Disk Drive (HDD)), or on virtual storage systems provided by a cloud service provider, etc.

Figure 1:
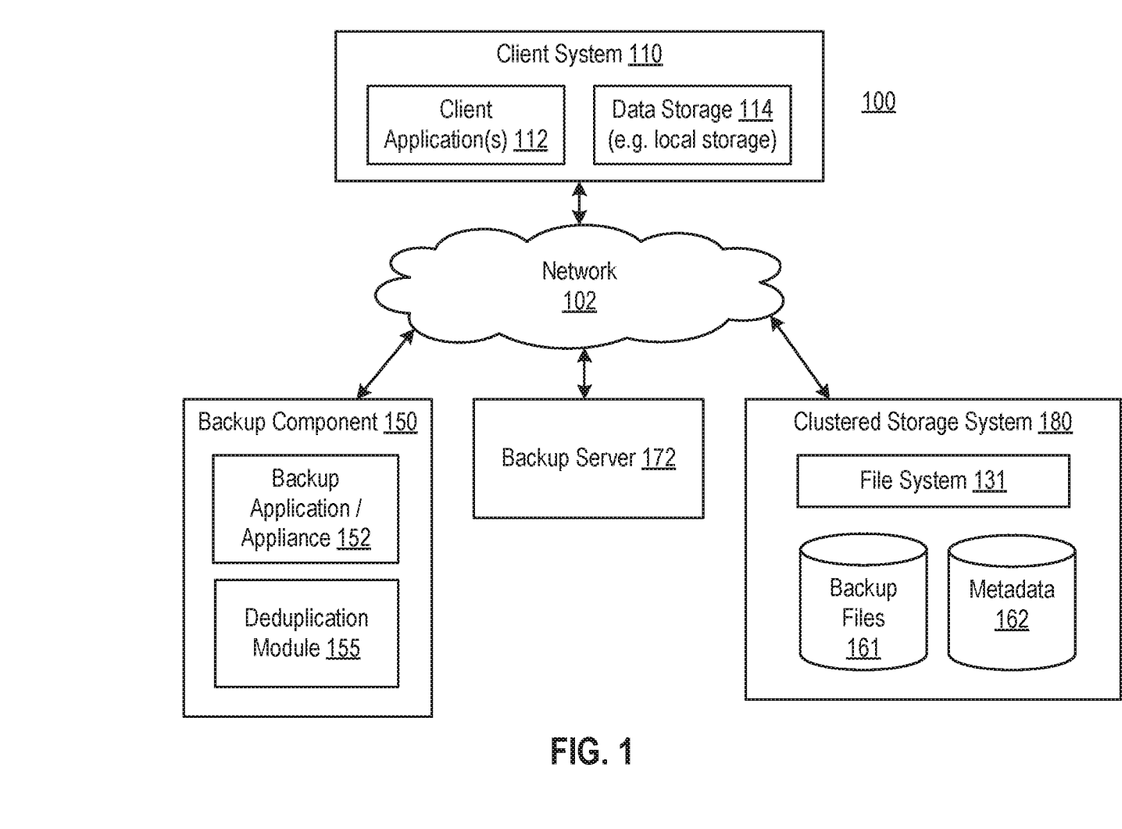
FIG. 1 is a block diagram illustrating an example operating environment according to one or more embodiments of the disclosure.

More specifically, and with reference to FIG. 1, shown is a block diagram illustrating an example of an operating environment 100 for distributing phases of deduplication processing within a clustered storage environment according to one or more embodiments of the disclosure. As shown, the environment 100 may include a client system 110, backup system 150, backup server 172, and a clustered storage system 180. It should be noted that the components of operating environment 100 may interact via a network 102, which may be any type of wired or wireless network including a local area network (LAN), a wide area network (WAN), or a direct communication link, or other suitable connection.

As shown, the operating environment 100 may include a client or client system (or computer, or device) 110 that may be associated with a client or customer of a data backup and protection service, and a backup system 150 that may be associated with a data backup and protection service provider. For example, the client system 110 may provide computing resources (e.g. webservers, databases, etc.) for users (e.g. website visitors) of the customer, data from which may be protected by the backup and data protection service provider. Accordingly, the client system 110 may act as a client from which backups are performed. In some embodiments, the client system 110 may comprise a virtual machine. In addition, the client system 110 may host one or more client applications 112, and may include data storage 114, as well as an interface for communicating with other systems and devices, such as the backup system 150. In general, the client applications 112 may create new and/or modified data that is desired to be protected. As such, the client system 110 is an example of a host device. The data storage 114 can be used to store client data, which may, along with the client system 110 (e.g. client applications 112) may be backed up using the backup system 150. As further described herein, components of the client system 110 (e.g. client applications, 112, data storage 114, etc.) may be a data source, or be associated with, one or more data sources such as a database, VM, storage device, etc. In addition, components of the client system 110 may be data sources that are associated with the client system 110, but reside on separate servers such as a data server, or a cloud-computing infrastructure. The client system 110 may include a backup client application, or plug-in application, or API that cooperates with backup system 150, to create backups of client data. The backed-up data can also be restored to the client system 110.

In one embodiment, backup component 150 may represent one or more components of a Data Domain Restorer (DDR)-based deduplication storage system, and backup server 172 may be implemented in conjunction with a Data Domain deduplication storage server provided by Dell EMC for use with DDR storage devices. For example, the backup server 172 may be a stand-alone entity, or can be an element of the clustered storage system 180. In some embodiments, the backup server 172 may be a Dell EMC PowerProtect Data Manager or Dell EMC PowerProtect X400 appliance, although no particular server is required, and other backup and storage system configurations are contemplated.

The backup component 150, may include a backup application (or appliance) 152 that performs (or manages, coordinates, etc.) the creation and restoration of data that may be backed-up. For example, data to be backed-up from the client system 110 may be communicated from the client system 110 to the backup application 152 for initial processing, after which the processed data is uploaded from the backup application 152 for storage at the clustered storage system (e.g. as backup data 161). In some embodiments, the backup application 152 may cooperate with a backup client application of the client system 110 to back up client data to the clustered storage system 180. A backup application 152 may also cooperate with a backup client application to restore backup data from the clustered storage system 180 to the client system 110. In some embodiments, the backup application 152 may be a part of, or work in conjunction with, a storage appliance. For example, the storage appliance may include a Dell EMC CloudBoost appliance, although any suitable appliance is contemplated. In addition, the backup application 152 may provide a variety of useful functionalities such as source-side data deduplication, data compression, and WAN optimization boost performance and throughput while also possibly reducing the consumption and cost of network bandwidth and cloud storage capacity.

One, some, or all, of these functions of the backup application 152 may be performed using deduplication logic via deduplication module 155. For example, the deduplication module 155 can provide data segmentation, as well as in-flight encryption as the data is sent by the storage application 152 to the clustered storage system 180. However, as further described herein, in some embodiments, data deduplication may be performed entirely within the clustered storage environment 180. It should be noted that the backup application (or storage appliance) 152 can be implemented in various forms, such as a virtual, physical, or native public cloud appliance to fit the requirements of a particular configuration, and the backup application 152 can be used with various types of data protection environments, including public and private object storage clouds.

The clustered storage system 180 (as further described herein) may store backup files 161 (or backup objects) within a one or more nodes (as further described herein). As shown, the clustered storage system 180 may also store metadata 162 for (or associated with) the backup files 161, and one or more instances of a filesystem 131 that catalogs backup files and other data residing in the clustered environment. In general, the storage of backup files 161 may be configured to store client system 110 data backups that can be restored in the event of a loss of data.

Figure 2:
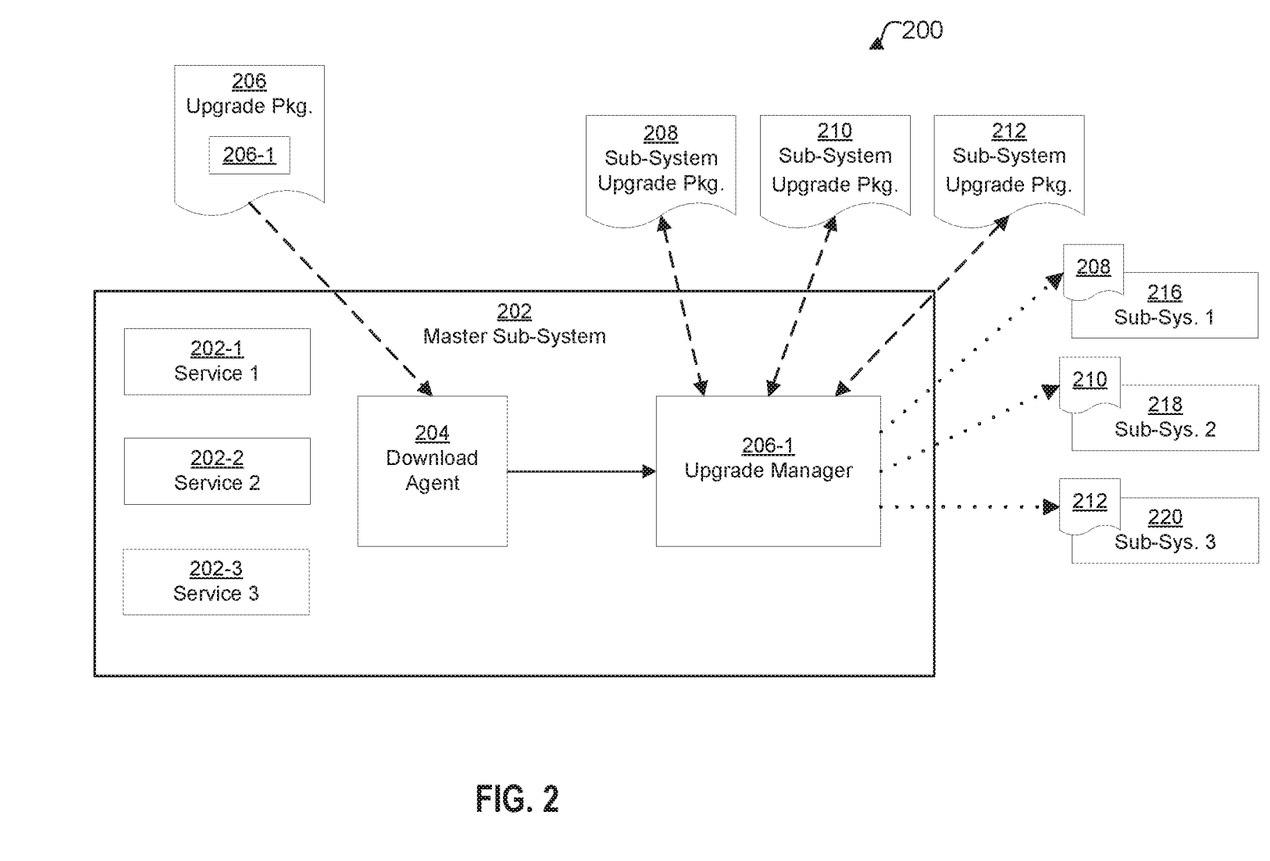
FIG. 2 is a block diagram illustrating an example environment according to one or more embodiments of the disclosure.

As shown in the high-level block diagram 200 of FIG. 2, the Upgrade Engine generates an upgrade manager service 206-1 which is delivered by the Upgrade Engine by sending an upgrade package 206 to a download agent 204 within a master sub-system 202. The master sub-system 202 may have a plurality of provided services 202-1, 202-2, 202-3 supported by the execution of underlying sub-systems 216, 218, 220 of the master sub-system 202. The Upgrade Engine generates the upgrade manager service 206-1 to be executed from within the master sub-system 202 and to periodically monitor a current deployment status of various sub-systems 216, 218, 220 and to periodically check for available sub-system upgrade packages 208, 210, 212 generated by the Upgrade Engine. The upgrade manager service 206-1 downloads the sub-system upgrade packages 208, 210, 212 individually—as opposed to downloading a batch or grouping of the sub-system upgrade packages 208, 210, 212 together. The upgrade manager service 206-1 implements each sub-system upgrade packages 208, 210, 212 individually at each corresponding sub-system 216, 218, 220. In various embodiments, the Upgrade Engine generates the upgrade manager service 206-1 to start running within the master sub-system 202 just prior to initiating requests for the sub-system upgrade packages 208, 210, 212, at which time the manager service 206-1 may check the current deployment status of one or more of the sub-systems 216, 218, 220. In addition, the Upgrade Engine may generate the upgrade manager service 206-1 to cease running (i.e. stop execution) within the master sub-system 202 upon completion of implementing one or more of the sub-system upgrade packages 208, 210, 212 so as not result in the master sub-system 202 incurring additional costs from the upgrade manager service 206-1.

Figure 3A:
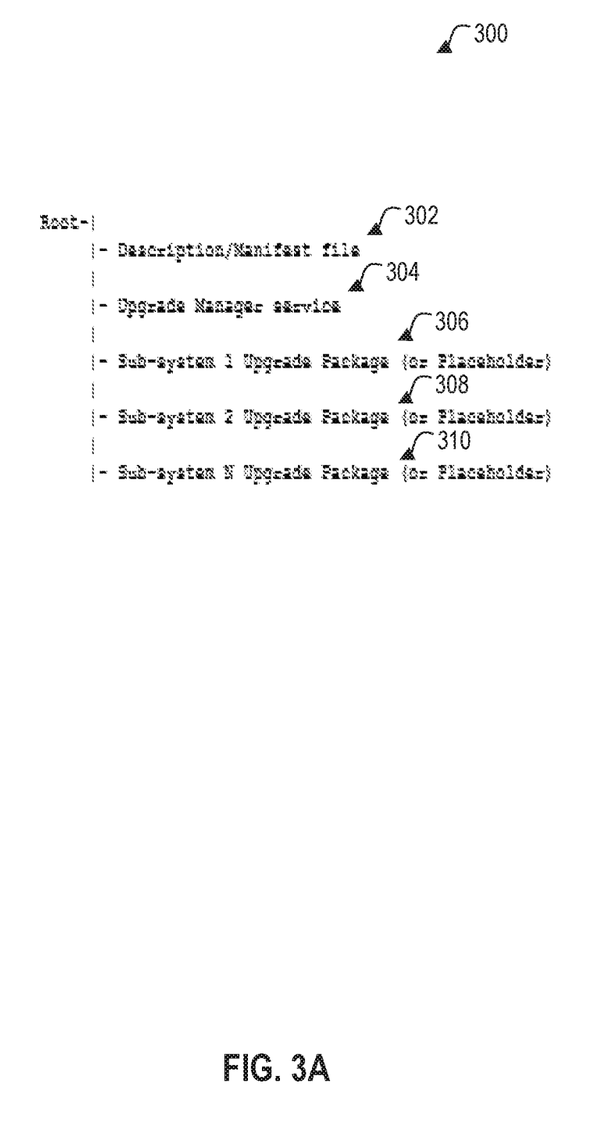
FIG. 3A is a block diagram illustrating an example environment according to one or more embodiments of the disclosure.
Figure 3B:
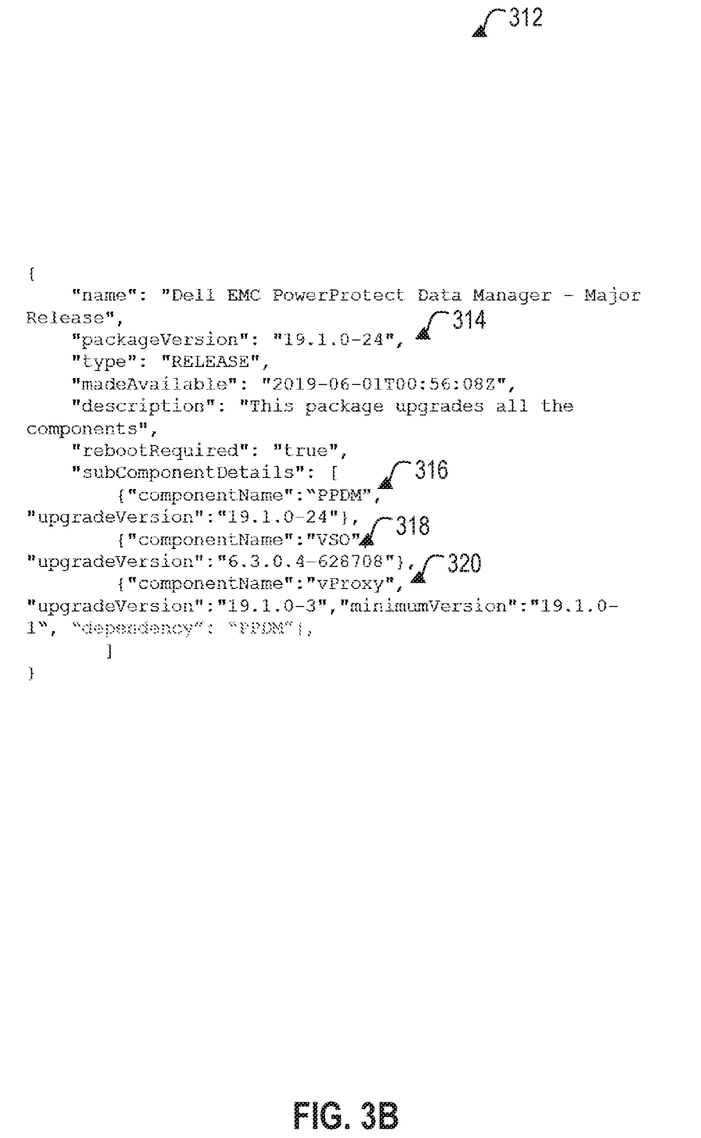
FIG. 3B is a block diagram illustrating an example environment according to one or more embodiments of the disclosure.

As shown in the high-level diagram 300 of the upgrade package 206 in FIG. 3A, the upgrade package 206 generated by the Upgrade Engine includes a Description/Manifest file 302, a section 304 that includes the upgrade manager service 206-1 and sections 306, 308, 310 for each of the sub-system upgrade packages 208, 210, 212. In some embodiments, the upgrade package 206 is delivered as a single, signed and compressed archive file (e.g. JAR format). The sub-system upgrade packages 208, 210, 212 may be in the same format as the upgrade package 206 or in any format required by a corresponding sub-system. In some embodiments, one or more binary files may be included in the upgrade package 206.

In some embodiments, when a remote download connection is configured between the Upgrade Engine and the master sub-system 202, the sections 306, 308, 310 for each of the sub-system upgrade packages 208, 210, 212 may be placeholders such that the sub-system upgrade packages 208, 210, 212 are not themselves included in the upgrade package 206. Instead, the upgrade manager service 206-1 individually requests and receives the sub-system upgrade packages 208, 210, 212 from the Upgrade Engine. In some embodiments, if a remote download connection is not configured between the Upgrade Engine and the master sub-system 202, the Upgrade Engine may generate the upgrade manager service 206-1 to actually include the source code (in one or more binary files) for implementing the sub-system upgrade packages 208, 210, 212 from within the master sub-system 202.

Figure 4:
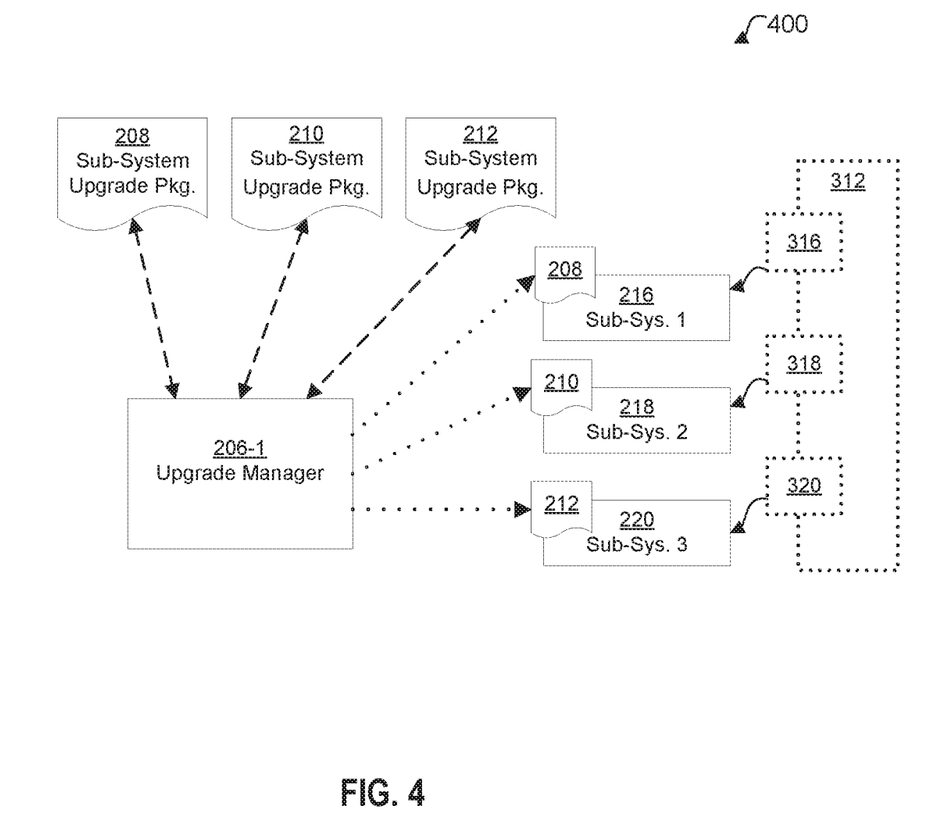
FIG. 4 is a block diagram illustrating an example environment according to one or more embodiments of the disclosure.

As shown in the high-level diagram 312 of the upgrade package 206 in FIG. 3A, a Description/Manifest file describes information, such as: the product version 314 of the master-subsystem 202 and a minimum application software version of the master sub-system 202. The upgrade package 206 may also include information 316, 318, 320 about each of the sub-system upgrade packages 208, 210, 212, such as: sub-system name (or identifier), upgrade version number, minimum applicable version of currently deployed sub-system and any current data dependencies on other sub-systems. In some embodiments, the upgrade package 206 may be delivered in JSON format. As shown in the high-level diagram 400 of FIG. 4, according to various embodiments, information 316, 318, 320 in the upgrade package 206 may include the sub-system upgrade packages 208, 210, 212 packages themselves such that the sub-system upgrade packages 208, 210, 212 are accessed by the upgrade manager 206-1 in the upgrade package 206 and then implemented at the sub-system upgrade packages 208, 210, 212.

Figure 5:
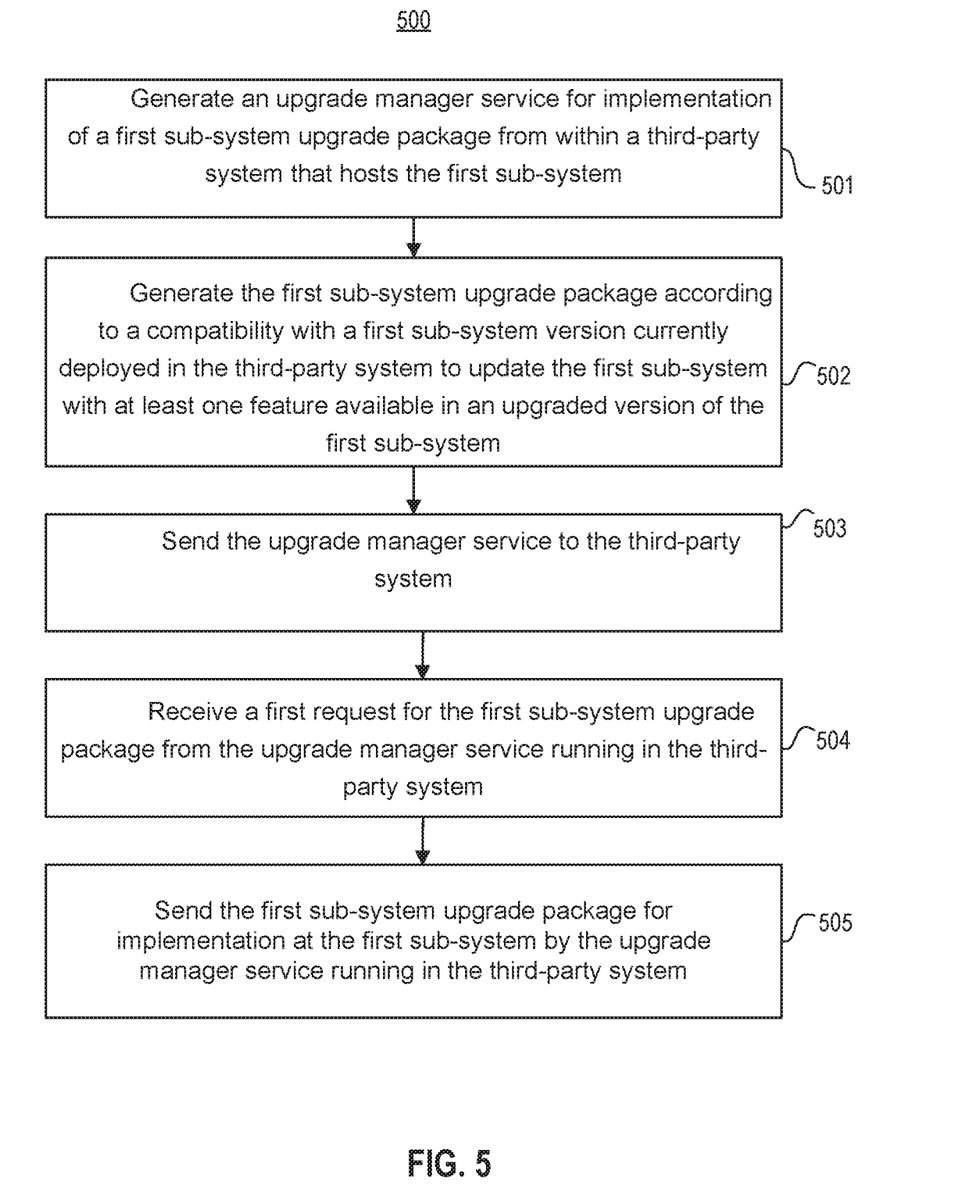
FIG. 5 is a flow diagram illustrating an example method according to one or more embodiments of the disclosure.

FIG. 5 is a flow diagram illustrating an example method 500 granular and customized upgrades of sub-systems deployed within a third-part system according to one or more embodiments of the disclosure.

At step 501, the Upgrade Engine generates an upgrade manager service for implementation of a first sub-system upgrade package from within a third-party system that hosts the first sub-system. In addition, the Upgrade Engine generates the upgrade manager service for implementation of a second sub-system upgrade package from within the third-party system that also hosts the second sub-system. The first and second sub-system upgrade packages can be sent to the third-party system individually in response to a request by the third-party system. In another embodiment, one or more available sub-system upgrade packages generated by the Upgrade Engine will be requested by the upgrade manager service for download to the third-party system from a central repository associated with the Upgrade Engine.

At step 502, the Upgrade Engine generates the first sub-system upgrade package according to a compatibility with a first sub-system version currently deployed in the third-party system to update the first sub-system with at least one feature available in an upgraded version of the first sub-system. For example, upgrade files and scripts included in the first sub-system upgrade package correspond to the same upgrade version. In addition, the Upgrade Engine may keep track of additional patches or customized sub-system hotfixes implemented at the first sub-system and as various upgrade versions of the first sub-system become available, the Upgrade Engine generates first sub-system upgrade packages for the first sub-system that will apply upgrades to the first sub-system that are compatible with the additional patches and/or customized sub-system hotfixes such that upgrades implemented by the upgrade manager service do not overwrite the previously implemented additional patches and/or customized hotfixes but still implement new or upgraded features at the first sub-system. In addition, first sub-system upgrade package will be generated by the Upgrade Engine to include instructions, software and/or logic compatible with a current version of the deployed first sub-system such that the included instructions, software and/or logic are necessary for successful implementation of an upgraded version of the first sub-system with respect to one or more currently available features of the deployed first sub-system.

In addition, the Upgrade Engine generates a second sub-system upgrade package according to a compatibility with a second sub-system version currently deployed in the third-party system to update the second sub-system with at least one feature available in an upgraded version of the second sub-system, the feature available in the upgraded version of the first sub-system being different than the feature available in the upgraded version of the second sub-system. It is understood that the Upgrade Engine is not limited to upgrade only two sub-systems and may instead generate sub-system upgrade packages for any number of sub-system, where each respective sub-system may itself have any number of subsequently occurring upgrade versions that include any number of upgraded features and/or new features.

At step 503, the Upgrade Engine sends the upgrade manager service to the third-party system. In addition, as subsequent versions of the upgrade manager service are generated by the Upgrade Engine, each subsequent version of the upgrade manager service will be sent to the third-party system to ensure a most-recent upgrade manager service runs at the third-party system.

At step 504, the Upgrade Engine receives a first request for the first sub-system upgrade package from the upgrade manager service running in the third-party system. In addition, the Upgrade Engine may receive a second request for the second sub-system upgrade package from the upgrade manager service running in the third-party system. According to various embodiments, in response to the first and second request (which may or may not be received concurrently), the Upgrade Engine may access a central repository to identify most-recently generated first and second sub-system upgrade packages.

At step 505, the Upgrade Engine sends the first sub-system upgrade package for implementation at the first sub-system by the upgrade manager service running in the third-party system. In various embodiments, the Upgrade Engine sends the second sub-system upgrade package for implementation at the second sub-system by the upgrade manager service running in the third-party system.

In various embodiments, the Upgrade Engine generates the upgrade manager service to perform a pre-check of the first sub-system (and/or the second sub-system) from within the third-party system prior to implementation of the first sub-system upgrade package (and/or the second sub-system upgrade package). For example, a pre-check may be performed by the upgrade manager service to identify one or more policies associated with the first sub-system (or any other sub-system), to determine a status of at least one proxy backing up the first sub-system and/or to determine a status of storage associated with the first sub-system. For example, a pre-check may identify any file-system issues/errors in existence, whether a read/write operation can be executed with respect to a particular disc(s), a status of connectivity between the first sub-system and other sub-systems (or virtual machine proxies associated with the first sub-system) and/or a status of the availability of the virtual machine proxies associated with the first sub-system.

According to one embodiment, a pre-check may provide a determination of whether backed-up data will be compatible with the feature available in the upgraded version of the first sub-system (or any other sub-system). Upon a determination of an incompatibility between the backed-up data and the feature, the upgrade manager service may provide an opt-out option (or delay option) prior to implementation of the first sub-system upgrade package. In another embodiment, a pre-check may identify one or more active jobs or queued jobs of the first sub-system (or any other sub-system) and the upgrade manager service may provide a warning to halt the jobs and/or suspend the job queue prior to implementation of the first sub-system upgrade package. In addition, the Upgrade Engine generates the upgrade manager service to perform a post-check(s) after implementation of the first sub-system upgrade package (or any other sub-system upgrade package). For example, the post-check may determine if there were any errors that occurred during the implementation of the first sub-system upgrade package and/or whether one or more portions of the first sub-system upgrade package were not implemented so as to not override customized features already implemented at the first sub-system.

Figure 6:
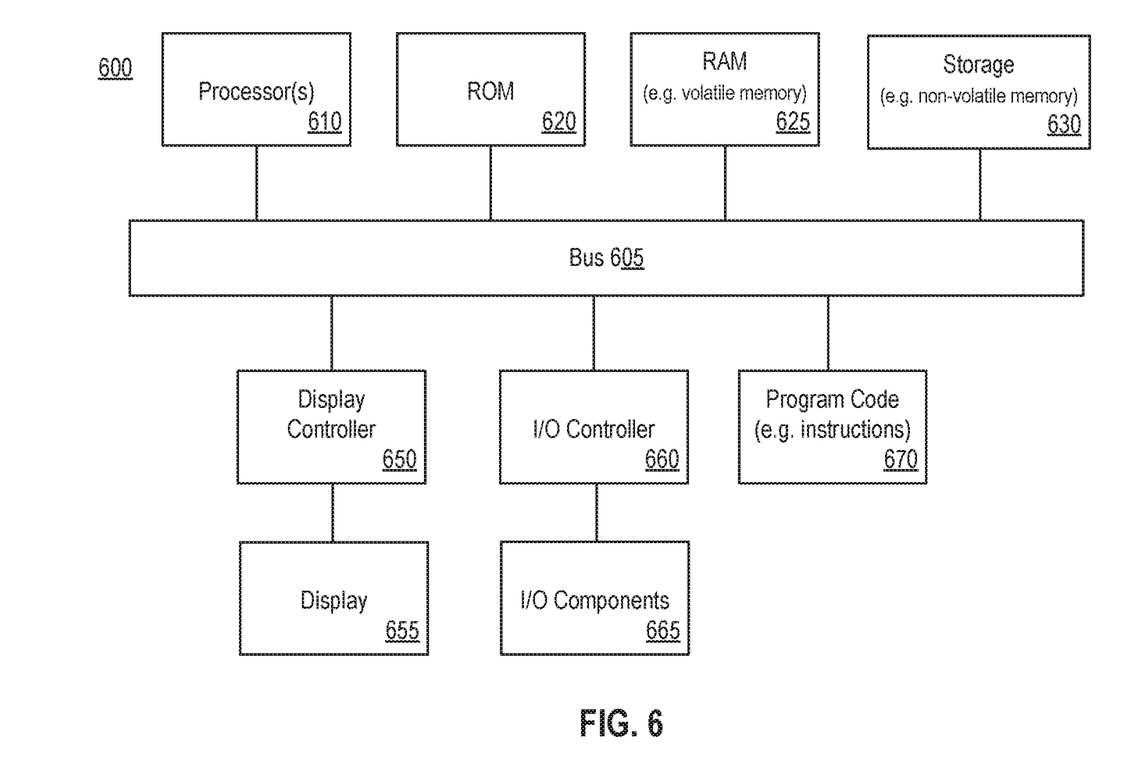
FIG. 6 is a block diagram illustrating an example of a computing system that may be used in conjunction with one or more embodiments of the disclosure.

FIG. 6 shows a block diagram of an example of a computing system that may be used in conjunction with one or more embodiments of the disclosure. For example, computing system 600 (or system, or server, or computing device, or device) may represent any of the devices or systems (e.g. clustered storage system 180, node 212, CWB 206, CSP 210, etc.) described herein that perform any of the processes, operations, or methods of the disclosure. Note that while the computing system 600 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 600 may include a bus 605 which may be coupled to a processor 610, ROM (Read Only Memory) 620, RAM (or volatile memory) 625, and storage (or non-volatile memory) 630. The processor(s) 610 may retrieve stored instructions from one or more of the memories 620, 625, and 630 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 610 may perform operations in an on-demand or "cloud computing" environment or as a service (e.g. within a "software as a service" (SaaS) implementation). Accordingly, the performance of operations may be distributed among the one or more processors 610, whether residing only within a single machine or deployed across a number of machines. For example, the one or more processors 610 may be located in a single geographic location (e.g. within a home environment, an office environment, or a server farm), or may be distributed across a number of geographic locations. The RAM 625 may be implemented as, for example, dynamic RAM (DRAM), or other types of memory that require power continually in order to refresh or maintain the data in the memory. Storage 630 may include, for example, magnetic, semiconductor, tape, optical, removable, non-removable, and other types of storage that maintain data even after power is removed from the system. It should be appreciated that storage 630 may be remote from the system (e.g. accessible via a network).

A display controller 650 may be coupled to the bus 605 in order to receive display data to be displayed on a display device 655, which can display any one of the user interface features or embodiments described herein and may be a local or a remote display device. The computing system 600 may also include one or more input/output (I/O) components 665 including mice, keyboards, touch screen, network interfaces, printers, speakers, and other devices. Typically, the input/output components 665 are coupled to the system through an input/output controller 660.

Program code 670 may represent any of the instructions, applications, software, libraries, toolkits, modules, components, engines, units, functions, logic, etc. as described herein (e.g. clustered storage system 180, node 212, CWB 206, CSP 210, etc.). Program code 670 may reside, completely or at least partially, within the memories described herein (e.g. non-transitory computer-readable media), or within a processor during execution thereof by the computing system. Program code 670 may include both machine code, such as produced by a compiler, and files containing higher-level or intermediate code that may be executed by a computing system or other data processing apparatus (or machine) using an interpreter. In addition, program code 670 can be implemented as software, firmware, or functional circuitry within the computing system, or as combinations thereof. Program code 670 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A computer-implemented method comprising:
generating an upgrade manager service for upgrading at least a first sub-system, the upgrade manager service being configured to: (i) run within a master sub-system, (ii) retrieve a first sub-system upgrade package generated for the first sub-system from the master sub-system, and (iii) implement the first sub-system upgrade package by the upgrade manager service running in the master sub-system in communication with the first sub-system;

generating the first sub-system upgrade package according to a compatibility with any corrections to the first sub-system currently deployed in the master sub-system to update the first sub-system with at least one feature available in an upgraded version of the first sub-system, the first sub-system upgrade package including a section for the upgrade manager service and a section for upgrade files for the first sub-system;

receiving a first request for the first sub-system upgrade package from the upgrade manager service running in the master sub-system;

sending the first sub-system upgrade package to the master sub-system; and implementing the first sub-system upgrade at the first sub-system by the upgrade manager service running in the master sub-system.

2. The computer-implemented method of claim 1, further comprising:

generating a second sub-system upgrade package according to a compatibility with a second sub-system version to update a second sub-system with at least one feature available in an upgraded version of the second sub-system, the feature available in the upgraded version of the first sub-system being different than the feature available in the upgraded version of the second sub-system;

receiving a second request for the second sub-system upgrade package from the upgrade manager service running in the master sub-system; and sending the second sub-system upgrade package for implementation at the second sub-system by the upgrade manager service running in the master sub-system.

3. The computer-implemented method of claim 2, further comprising:

generating the upgrade manager service to perform a pre-check of the first sub-system from within the master sub-system prior to the implementation of the first sub-system upgrade package.

4. The computer-implemented method of claim 3, further comprising at least one of:

identifying one or more policies associated with the first sub-system;

determining a status of at least one proxy backing up the first sub-system; and determining a status of storage associated with the first sub-system.

5. The computer-implemented method of claim 4, further comprising:

determining whether backed-up data will be compatible with the feature available in the upgraded version of the first sub-system.

6. The computer-implemented method of claim 5, further comprising:

generating the upgrade manager service to provide an opt-out option prior to the implementation of the first sub-system upgrade package based on a determination of an incompatibility between the backed-up data and the feature available in the upgraded version of the first sub-system.

7. The computer-implemented method of claim 2, further comprising:

generating the second sub-system upgrade package in accordance with a data dependency currently existing between the first and the second sub-systems, wherein the implementation of the second sub-system upgrade package, by the upgrade manager service running in the master sub-system, complies with the data dependency between the first and the second sub-systems.

8. A system comprising:

one or more processors; and a non-transitory computer readable medium storing a plurality of instructions, which when executed, cause the one or more processors to:

generate an upgrade manager service for upgrading at least a first sub-system hosted by a master sub-system, the upgrade manager service being configured to: (i) run within the master sub-system, (ii) retrieve a first sub-system upgrade package generated for the first sub-system, and (iii) implement the first sub-system upgrade package by the upgrade manager service running in the master sub-system;

generate the first sub-system upgrade package according to a compatibility with any corrections to the first sub-system currently deployed in the master sub-system to update the first sub-system with at least one feature available in an upgraded version of the first sub-system, the first sub-system upgrade package including a section for the upgrade manager service and a section for upgrade files for the first sub-system;

send the upgrade manager service to the master sub-system;

receive a first request for the first sub-system upgrade package from the upgrade manager service running in the master sub-system;

send the first sub-system upgrade package to the master sub-system; and implement the first sub-system upgrade package at the first sub-system by the upgrade manager service running in the master sub-system.

9. The system of claim 8, wherein the plurality of instructions, when executed, further cause the one or more processors to:

generate a second sub-system upgrade package according to a compatibility with a second sub-system version to update a second sub-system with at least one feature available in an upgraded version of the second sub-system, the feature available in the upgraded version of the first sub-system being different than the feature available in the upgraded version of the second sub-system;

receive a second request for the second sub-system upgrade package from the upgrade manager service running in the master sub-system; and send the second sub-system upgrade package for implementation at the second sub-system by the upgrade manager service running in the master sub-system.

10. The system of claim 9, wherein the plurality of instructions, when executed, further cause the one or more processors to:

generate the upgrade manager service to perform a pre-check of the first sub-system from within the master sub-system prior to the implementation of the first sub-system upgrade package.

11. The system of claim 10, wherein the pre-check of the first sub-system comprises at least one of:

an identification of one or more policies associated with the first sub-system;

a determination of a status of at least one proxy backing up the first sub-system; and a determination of a status of storage associated with the first sub-system.

12. The system of claim 11, wherein the determination of a status of at least one proxy backing up the first sub-system comprises:
a determination of whether backed-up data will be compatible with the feature available in the upgraded version of the first sub-system.

13. The system of claim 12, wherein the plurality of instructions, when executed, further cause the one or more processors to:
generate the upgrade manager service to provide an opt-out option prior to the implementation of the first sub-system upgrade package based on a determination of an incompatibility between the backed-up data and the feature available in the upgraded version of the first sub-system.

14. The system of claim 9, wherein the plurality of instructions, when executed, further cause the one or more processors to:
generate the second sub-system upgrade package in accordance with a data dependency currently existing between the first and the second sub-systems, wherein the implementation of the second sub-system upgrade package, by the upgrade manager service running in the master sub-system, complies with the data dependency between the first and the second sub-systems.

15. A computer program product comprising a non-transitory computer-readable medium having a computer-readable program code embodied therein to be executed by one or more processors, the program code including instructions to:
generate an upgrade manager service for upgrading at least a first sub-system, the upgrade manager service being configured to: (i) run within a master sub-system, (ii) retrieve a first sub-system upgrade package generated for the first sub-system from the master sub-system, and (iii) implement the first sub-system upgrade package by the upgrade manager service running in the master sub-system in communication with the first sub-system;
generate the first sub-system upgrade package according to a compatibility with any corrections to the first sub-system currently deployed in the master sub-system to update the first sub-system with at least one feature available in an upgraded version of the first sub-system, the first sub-system upgrade package including a section for the upgrade manager service and a section for upgrade files for the first sub-system;
receive a first request for the first sub-system upgrade package from the upgrade manager service running in the master sub-system;
send the first sub-system upgrade package to the master sub-system; and
implement the first sub-system upgrade at the first sub-system by the upgrade manager service running in the master sub-system.

16. The computer program product of claim 15, wherein the program code includes further instructions to:
generate a second sub-system upgrade package according to a compatibility with a second sub-system version to update a second sub-system with at least one feature available in an upgraded version of the second sub-system, the feature available in the upgraded version of the first sub-system being different than the feature available in the upgraded version of the second sub-system;
receive a second request for the second sub-system upgrade package from the upgrade manager service running in the master sub-system; and
send the second sub-system upgrade package for implementation at the second sub-system by the upgrade manager service running in the master sub-system.

17. The computer program product claim 16, wherein the program code includes further instructions to:
generate the upgrade manager service to perform a pre-check of the first sub-system from within the master sub-system prior to the implementation of the first sub-system upgrade package.

18. The computer program product claim 17, wherein the pre-check of the first sub-system comprises at least one of:
an identification of one or more policies associated with the first sub-system;
a determination of a status of at least one proxy backing up the first sub-system; and
a determination of a status of storage associated with the first sub-system.

19. The computer program product claim 18, wherein the program code includes further instructions to:
determine whether backed-up data will be compatible with the feature available in the upgraded version of the first sub-system.

20. The computer program product claim 19, wherein the program code includes further instructions to:
generate the upgrade manager service to provide an opt-out option prior to the implementation of the first sub-system upgrade package based on a determination of an incompatibility between the backed-up data and the feature available in the upgraded version of the first sub-system; and
generate the second sub-system upgrade package in accordance with a data dependency currently existing between the first and the second sub-systems, wherein the implementation of the second sub-system upgrade package, by the upgrade manager service running in the master sub-system, complies with the data dependency between the first and the second sub-systems.

* * * * *